(12) United States Patent
Bicakci

(10) Patent No.: US 9,609,057 B2
(45) Date of Patent: Mar. 28, 2017

(54) TECHNIQUE FOR SYNCHRONIZED CONTENT SHARING

(75) Inventor: Oner Bicakci, Fremont, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 235 days.

(21) Appl. No.: 14/113,698

(22) PCT Filed: May 10, 2011

(86) PCT No.: PCT/US2011/035828
§ 371 (c)(1),
(2), (4) Date: Oct. 24, 2013

(87) PCT Pub. No.: WO2012/154169
PCT Pub. Date: Nov. 15, 2012

(65) Prior Publication Data
US 2014/0047131 A1  Feb. 13, 2014

(51) Int. Cl.
*G06F 15/16* (2006.01)
*H04L 29/08* (2006.01)
*G06F 17/30* (2006.01)
*G06F 12/00* (2006.01)

(52) U.S. Cl.
CPC .... *H04L 67/1095* (2013.01); *G06F 17/30044* (2013.01); *G06F 17/30064* (2013.01); *G06F 17/30283* (2013.01); *H04L 29/0845* (2013.01)

(58) Field of Classification Search
CPC ......... G06F 17/30044; G06F 17/30041; G06F 17/30283; G06F 17/30064
USPC ................................ 709/203, 223–229, 248
See application file for complete search history.

(56) References Cited

U.S. PATENT DOCUMENTS

| 6,996,782 | B2 * | 2/2006 | Parker et al. .................. 715/764 |
| 7,747,560 | B2 | 6/2010 | Goldthwaite et al. |
| 7,849,222 | B2 | 12/2010 | Han et al. |
| 7,986,324 | B2 | 7/2011 | Funaki et al. |
| 8,000,726 | B2 * | 8/2011 | Altman .............. G06Q 30/0207 455/456.1 |
| 8,347,334 | B2 | 1/2013 | White et al. |
| 8,560,946 | B2 * | 10/2013 | Fugitt et al. .................. 715/700 |
| 8,718,386 | B2 * | 5/2014 | Das et al. ...................... 382/225 |
| 8,726,153 | B2 | 5/2014 | Noda et al. |
| 2004/0172423 | A1 | 9/2004 | Kaasten et al. |
| 2006/0156246 | A1 * | 7/2006 | Williams et al. ............. 715/764 |
| 2006/0220986 | A1 * | 10/2006 | Takabe et al. .................... 345/9 |

(Continued)

FOREIGN PATENT DOCUMENTS

| CN | 101452367 | 6/2009 |
| CN | 101689137 | 3/2010 |

(Continued)

OTHER PUBLICATIONS

Delaet et al., "Managing your Content with CIMPLE—A Content-Centric Storage Interface", 2009 IEEE 34th Conference on Local Computer Networks (LCN 2009), Zurich, Switzerland, Oct. 20-23, 2009.

(Continued)

*Primary Examiner* — Zarni Maung

(57) ABSTRACT

Multiple media devices (101-104) at different locations can advantageously synchronize shared content by including chronology information with each piece of content. Each media device maps received content pieces (102, 104) from other devices, along with content pieces (108, 110) on the device itself to a common time line (106). The mapped content, when displayed, will depict the earliest content earliest on the time line and the latest content piece appears latest on the time line.

15 Claims, 1 Drawing Sheet

(56) References Cited

U.S. PATENT DOCUMENTS

| | | |
|---|---|---|
| 2008/0155058 A1 | 6/2008 | Prasad et al. |
| 2009/0006771 A1 | 1/2009 | Freeman et al. |
| 2009/0067753 A1* | 3/2009 | Hanechak ............. G06T 3/0006 382/298 |
| 2009/0150772 A1 | 6/2009 | Noda et al. |
| 2009/0216806 A1* | 8/2009 | Feuerstein ........ G06F 17/30994 |
| 2009/0300169 A1 | 12/2009 | Sagar et al. |
| 2010/0037179 A1 | 2/2010 | Ito |
| 2011/0138306 A1* | 6/2011 | Soohoo .................. G06Q 30/00 715/760 |
| 2012/0131461 A1* | 5/2012 | Raymond et al. ............ 715/723 |

FOREIGN PATENT DOCUMENTS

| | | |
|---|---|---|
| EP | 1681639 | 7/2006 |
| JP | 20080134866 | 6/2008 |
| JP | 2008193649 | 8/2008 |
| JP | 2009139756 | 6/2009 |
| JP | 2009301285 | 12/2009 |
| JP | 2010033132 | 2/2010 |
| JP | 2012527840 | 11/2012 |
| KR | 20100067976 | 6/2010 |
| KR | 201000067976 | 6/2010 |
| WO | WO2006115521 | 11/2006 |
| WO | WO2010135461 | 11/2010 |

OTHER PUBLICATIONS

Tian et al., "Research on Synchronization of Network Multimedia Courseware Nonlinear Editing System", Computer Sch., Beijing Inf. Sci. & Technology, Univ., Beijing, Feb. 16, 2009.

\* cited by examiner

TECHNIQUE FOR SYNCHRONIZED CONTENT SHARING

This application claims the benefit, under 35 U.S.C. §365 of International Application PCT/US2011/035,828, filed 10 May 2011, which accordance with PCT Article 21(2) on 15 Nov. 15, 2012, in English.

TECHNICAL FIELD

This invention relates to a technique for synchronizing the sharing of content across a network or combination of networks like the Internet.

BACKGROUND ART

The advent of various modes of electronic communications has dramatically increased the desire of users to exchange information. In some instances, the exchanged information can include voice or short text messages. In other instances, users seek to share media files, which can include still pictures or audio visual files. The sharing of media files among multiple parties can give rise to synchronization problems. Typically, the parties seeking to share media files reside in different locations, often in different time zones. Thus, a party seeking to share its media file with others does so based on its chronological data which can prove inconvenient for the intended recipients seeking content based on their specific time frame.

Presently, chronological synchronization tends to occur manually as each user chooses which data to view next. However, manual synchronization remains generally infeasible for the sharing of large content files among many users in different time zones.

Thus, a need exists for a technique for automatic content synchronization.

BRIEF SUMMARY OF THE INVENTION

Briefly, in accordance with a preferred embodiment of the present principles, a method for synchronizing content received from a plurality of users commences by first receiving the content, along with chronology information associated with the sharable content. Chronology information is received, along with the content following a request by one user for content from other users. Following receipt of the content, the content is mapped along a time line in accordance with the chronology information to synchronize the content for viewing.

DETAILED DESCRIPTION

Figure 1:
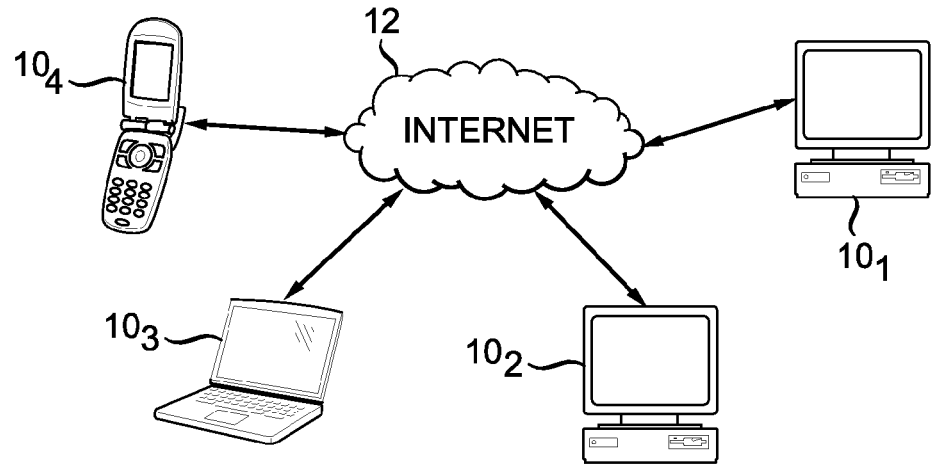
FIG. 1 depicts a block schematic diagram of a set of interconnected media devices for practicing the content synchronization method of the present principles.

FIG. 1 depicts a set of interconnected media devices $10_1$-$10_n$ where n equals 4 in the illustrated embodiment although a larger or smaller number of interconnected devices could exist. Each of the media devices $10_1$-$10_4$ has the ability to store content in the form of text, still pictures, video, audio and/or audio-visual programs, such as movies, as well as the ability to share such content with other interconnected media devices. As depicted in FIG. 1, the $10_1$-$10_4$ each media device enjoys a connection to the Internet 12. Although FIG. 1 shows a direct link between each of the media devices $10_1$-$10_4$ and the Internet 12, in practice, one or more intermediate networks typically serve to interconnect the individual media devices to the Internet.

The media devices $10_1$-$10_4$ can take different forms and typically reside at different locations in the same or different time zones. As depicted in FIG. 1, media devices $10_1$ and $10_2$ can take the form of desk-top computers whereas media device $10_3$ can takes the form of a lap-top computer. Media device $10_4$ can comprise a cellular telephone or personal data assistant. As will become better understood hereinafter, the particular structure of each media device has no significance, provided that each device has the ability to store, share, and display content.

The sharing of content among the media devices $10_1$-$10_4$ typically occurs in response to a request launched by a user of a media device for content from one or more other users stored on their media devices. Heretofore, to the extent that synchronization of the shared content was necessary, such synchronization occurred manually. In other words, each user would organize content, typically with any intrinsic knowledge as to the chronology of such content.

In accordance with the present principles, there is provided a method for synchronization of shared content so that content requested by a user from other users will be synchronized for display along a common time line, along with any content from the requesting user and any external content such as news and the like. To enable synchronization in accordance with the present principles, each piece of content stored by a user will have associated chronology information, including, but not limited to a time and date associated with such content. Typically, although not necessarily, the time and date associated with each piece of content will indicate the time and date of creation. In place of, or in addition to, the time and date of creation, the chronology information could include a presentation time and date, indicative of the desired time and date of display. The chronology information could include other time-related information associated with the content, for example birth date, anniversary date or other date that would provide useful for searching or mapping purposes. Typically, the chronology information comprises metadata that accompanies the associated content.

When a user requests content for sharing from one or more other users, the response to such a request will include not only the requested content, but the chronology information associated with such requested content. The media device, for example, media device $10_1$ of the user requesting the content will use the received chronology information to map the received content to a common time, along with any content which the user itself wants to display. A media device, such as the media device $10_1$, receiving shared content, will typically map such content by first comparing the chronology information associated with each of the received pieces of content, along with any desired content the user seeks to display as well. The user's desired content can include content the user has stored as well as live content (e.g., "global events" such as news, sports, weather for example.) From the chronology information from the various content pieces, the media device can arrange the content pieces in time order. Thus, the earliest content piece will appear earlier on the time line (usually, the left-hand end as seen in FIG. 2 as described hereinafter.) and the latest content piece appears latest on the time line (e.g., the right-hand end).

Figure 2:
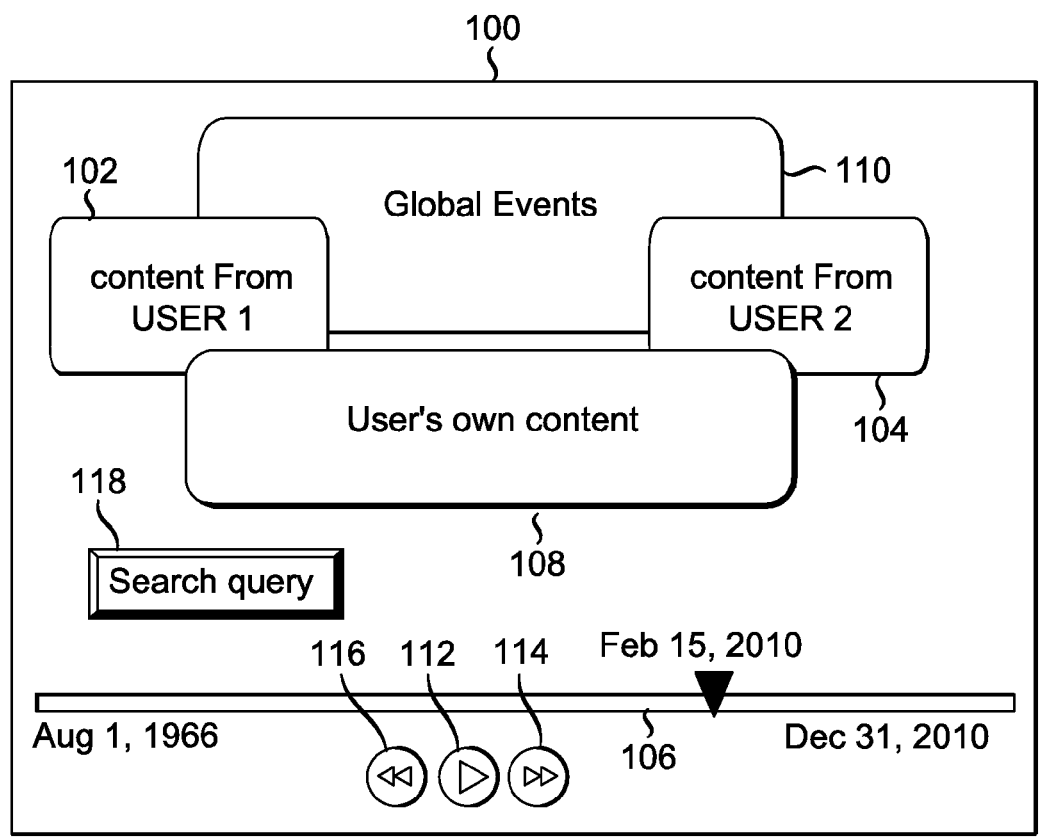
FIG. 2 depicts a display of content on a user's media device mapped to a time line in accordance with the content synchronization method of the present principles.

FIG. 2 depicts a screen 100 displayed by the of the media device 10₁ of FIG. 1 to show the mapping of the shared content, in the form of content pieces 102 and 104 from User 1 and User 2, respectively, to a common time line, depicted by line 106. For purposes of example, the content from User 1 has associated Chronology information in the form of a date of Aug. 1, 1996, whereas the content from User 2 has associated Chronology information in the form of a date of Dec. 31, 2010. Thus, when the content pieces 102 and 104 from User 1 and User 2, respectively, are mapped on the time line 102 of FIG. 2, the content piece 102 appears earlier on the time line (towards the left-hand side of the screen 100) whereas the content piece 104 appears later in time (towards the right-hand side of the screen 100).

The mapping of content can include content from the user, as well as content requested by the user. To that end, the screen of FIG. 2 also depicts a content piece 108 from the user. For purposes of example, Chronology Information associated with the user's content includes a date of Feb. 10, 2010. Thus, upon mapping of the user's own content piece 108 with the content pieces 102 and 104 from User 1 and User 22, the content piece 108 will lie between the content pieces 102 and 104. At the same time the content pieces 102, 104 and 108 get mapped to the time line 106.

In addition to displaying the content pieces 102, 104 and 106, the user could choose to display news or other information in the form of content piece 110 which bears the legend "global events." The content piece 110 appears in the background, relative to the content pieces 102, 104 and 108 as seen in FIG. 2. However, once a user selects a given content piece, for example by clicking a mouse, or touching the screen, then that content piece will appear in the foreground. To play, fast-forward or rewind a selected content piece, a user will select one of icons 112, 114 and 116, respectively. In this way, a user can pause/rewind/fast-forward/jump/play any of the mapped content from the oldest to the newest date.

The screen 100 also includes a search query box 118 for displaying a search query entered by the user. The association of chronology information with each content piece thus allows a user to search for content based on a date or time. Not only could a user search for content created on a certain date or time, a user could search for content using a data associated with a particular event, such as a birthday or anniversary.

The relative size of the content pieces 102, 104, 108, and 110 depicted in FIG. 2 correspond to the relative size of the content pieces. Thus, for example, content piece 110 has the largest size, followed by content piece 108 and then content pieces 102 and 104, which in the illustrated embodiment have approximately the same size.

The synchronization of shared content among two or more media devices, such as media devices 10₁-10₄ of FIG. 2 might require controlling (e.g., throttling) the data displayed by a given media device depending on the amount of content received by that device having a common display date. For example, a media device having less content to display on a given date need not make display changes so quickly. For a media device having a large amount of content designated for display on a given date, the data transferred from the sending media devices would slow down to avoid exhausting the media device with the least amount of content for that date.

As discussed above, a user can choose to display his or her content, along with the content received from others. In addition, the user can choose current events or other content available from sources on the Internet. To that end, a user can search for information whose date(s) correspond to the dates of the chronology information associated with one or more of the shared content or the user's own content. Such search can occur automatically in response to a media device-generated query to search for Internet-based content corresponding to one or more of the dates associated with the chronology information for a given piece of content.

The request for shared made by a user through his or her media device can include the ability to obtain content, but also the ability to receive live audio from the content-supplying media device. A content-requesting user could select audio from all of the media devices supplying shared content, or a sub-set of such media devices.

In addition to the chronology information, each piece of content could have associated geographical information indicative of the location of the location of media device. In this way, a media device can use the geographical information associated with requested content piece(s) to geographically map the media device(s) sending such content pieces. In this way, a user could emphasize content from certain geographical areas while minimizing content from other areas.

The foregoing describes a technique for synchronizing the sharing of content across a network or combination of networks like the Internet.

The invention claimed is:

1. A method for synchronizing content received from a plurality of users, comprising:
   receiving the content, along with chronology information associated with the content in response to a request by a user for content from other users and geographic information indicative of locations of media devices associated with the users;
   mapping the content along a time line in accordance with the chronology information and the geographic information to synchronize the content for viewing;
   rendering the mapped content from certain locations of the media devices for display based on user input, wherein said mapped content from certain locations is scaled based on size.

2. The method according to claim 1 further including the step of displaying the mapped content based on the geographic information.

3. The method according to claim 1 wherein the mapped content includes own content of the user.

4. The method according to claim 3 wherein the own content of the user is displayed in the foreground.

5. The method according to claim 4 wherein the content from other users is also displayed in the foreground.

6. The method according to claim 5 wherein the mapping includes mapping the content from other users along with own content of the user and wherein the content from other users is displayed in the background.

7. The method according to claim 1 wherein the request made by the user for content from other users includes a request for content having a chronology associated with a specific criterion.

8. The method according to claim 1 wherein the content also includes geographical information indicative of content location.

9. The method according to claim 8 wherein the request made by the user for content from other users includes a request for content from a particular location.

10. The method according to claim 1 wherein the request made by the user for content from other users includes a request for content from a particular location having a chronology associated with a specific criterion.

11. A method for synchronizing content received from a plurality of users, comprising:
receiving the content, along with chronology information associated with the content in response to a request by a user for content from other users and geographic information indicative of locations of media devices associated with the users, wherein the chronology information is associated with a specific criterion;
mapping the content along a time line in accordance with the chronology information and the geographic information to synchronize the content for viewing;
rendering the mapped content from certain locations of the media devices for display based on user input, wherein said mapped content from certain locations is scaled based on size.

12. The method according to claim 11 further comprising displaying the mapped content based on the geographic information.

13. The method according to claim 12 wherein the displaying includes displaying the specific criterion associated with the user's request.

14. A method for displaying content received from a plurality of users, comprising the step of:
receiving the content, along with chronology information associated with the content in response to a request by one user for content from other users and geographic information indicative of locations of media devices associated with the users;
mapping the content along a time line in accordance with the chronology information and the geographic information to synchronize the content for viewing; and
rendering the mapped content for display such that each piece of said mapped content is scaled according to its size.

15. A media device for synchronizing content received from a plurality of users, comprising a computer configured to (a) receive the content, along with chronology information associated with the content in response to a request by a-user for content from other users and geographic information indicative of locations of media devices associated with the users, wherein the chronology information is associated with a specific criterion; and (b) map the content along a time line in accordance with the chronology information and the geographic information to synchronize the content for viewing, and (c) render the mapped content from certain locations of the media devices for display based on user input, wherein said mapped content from certain locations is scaled based on size.

* * * * *

UNITED STATES PATENT AND TRADEMARK OFFICE
CERTIFICATE OF CORRECTION

PATENT NO.         : 9,609,057 B2                                         Page 1 of 1
APPLICATION NO.    : 14/113698
DATED              : July 26, 2016
INVENTOR(S)        : Oner Bicakci It is certified that error appears in the above-identified patent and that said Letters Patent is hereby corrected as shown below:

In the Claims

In Column 6, Line 16, delete:
"a-user"
And insert:
--a user--.

Signed and Sealed this
Sixth Day of June, 2017

Michelle K. Lee
*Director of the United States Patent and Trademark Office*